(12) United States Patent
Wang et al.

(10) Patent No.: US 10,101,762 B2
(45) Date of Patent: *Oct. 16, 2018

(54) SWITCHING CONVERTER TO OPERATE IN PULSE WIDTH MODULATION MODE OR PULSE SKIPPING MODE

(71) Applicant: STMicroelectronics (Shenzhen) R&D Co. Ltd, Shenzhen (CN)

(72) Inventors: Meng Wang, Shenzhen (CN); Xue Lian Zhou, Shenzhen (CN)

(73) Assignee: STMicroelectronics (Shenzhen) R&D Co. Ltd, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/702,917

(22) Filed: Sep. 13, 2017

(65) Prior Publication Data

US 2018/0004241 A1  Jan. 4, 2018

Related U.S. Application Data

(63) Continuation of application No. 15/218,605, filed on Jul. 25, 2016, now Pat. No. 9,791,883, which is a (Continued)

(30) Foreign Application Priority Data

Oct. 11, 2014  (CN) .......................... 2014 1 0537583

(51) Int. Cl.
    G05F 3/26      (2006.01)
    H02M 3/158    (2006.01)
    (Continued)

(52) U.S. Cl.
    CPC .............. G05F 3/262 (2013.01); H02M 1/08 (2013.01); H02M 3/158 (2013.01); H02M 2001/0032 (2013.01); Y02B 70/16 (2013.01)

(58) Field of Classification Search
    CPC .......... G05F 3/262; H02M 1/08; H02M 3/158
    See application file for complete search history.

(56) References Cited

U.S. PATENT DOCUMENTS 5,745,352 A  4/1998 Sandri et al.
7,245,113 B2  7/2007 Chen et al.
(Continued)

OTHER PUBLICATIONS

Filanovsky, I.M. and Baltes, H.P.: "Simple CMOS Analog Square-Rooting and Squaring Circuits," IEEE Transactions on Circuits and Systems—1: Fundamental Theory and Applications, vol. 39, No. 4, Apr. 1992, pp. 312-315.

*Primary Examiner* — Jue Zhang
(74) *Attorney, Agent, or Firm* — Crowe & Dunlevy

(57) ABSTRACT

An electronic device includes a current comparator to generate an output current based upon a difference between a current flowing in an output branch and a current flowing in an input branch. A pair of transistors is coupled to an output of the current comparator. A first amplifier has inputs coupled to the pair of transistors and to a reference voltage, the first amplifier being configured to subtract the reference voltage from a voltage across the pair of transistors and output a difference voltage. A second amplifier has inputs coupled to the difference voltage and to the reference voltage, the second amplifier being configured to subtract the difference voltage from the reference voltage and output a pulse skipping mode reference signal.

25 Claims, 2 Drawing Sheets

Related U.S. Application Data continuation of application No. 14/531,314, filed on Nov. 3, 2014, now Pat. No. 9,423,816.

(51) Int. Cl.
*H02M 1/08* (2006.01)
*H02M 1/00* (2006.01)

(56) References Cited

U.S. PATENT DOCUMENTS

| | | |
|---|---|---|
| 9,423,816 B2 * | 8/2016 | Wang ................. G05F 3/262 |
| 2006/0119338 A1 | 6/2006 | Soch |
| 2008/0018314 A1 | 1/2008 | Sheng et al. |
| 2010/0072968 A1 * | 3/2010 | Bianco ................. H02M 3/156 |
| | | 323/284 |
| 2012/0223687 A1 | 9/2012 | Liu et al. |
| 2012/0268095 A1 | 10/2012 | Wu |

\* cited by examiner

SWITCHING CONVERTER TO OPERATE IN PULSE WIDTH MODULATION MODE OR PULSE SKIPPING MODE

CROSS REFERENCE TO RELATED APPLICATION

This application is a continuation of U.S. patent application Ser. No. 15/218,605, filed Jul. 25, 2016, which is a continuation of U.S. patent application Ser. No. 14/531,314, filed Nov. 3, 2014, and now U.S. Pat. No. 9,423,816, which claims priority from Chinese Application for Patent No. 201410537583.1 filed Oct. 11, 2014, the disclosures of which are incorporated by reference.

FIELD OF THE DISCLOSURE

This disclosure relates to the field of DC to DC switching power converters, and, more particularly, to switching power converters that reduce power consumption of electronic devices.

BACKGROUND

As technology has evolved, handheld battery powered electronic devices, such as cellular phones and tablets, have grown in functionality, processing power, and screen resolution. As consumers now spend greater periods of time using these devices than in the past, a market desire for such devices to have a long battery life has emerged. At the same time, however, to ease the portability and enhance the aesthetics of such devices, a market desire for such devices to be as small as possible for a given screen size has emerged. These market desires can be at odds with each other, as a simple way to increase battery life is to increase the size of the battery in the device, however, such an increase in battery size may result in an increase in the size of the device itself.

One way to increase the battery life of a device that may not result in an increase in size of the device may be to reduce the power consumption of the device. To that end, such devices may switch between an active mode in which the device is actively performing functions, and a standby mode in which the device is passively performing functions, or even not performing functions. Since such devices may spend more time in the standby mode than the active mode, a reduction of power consumption in the standby mode may result in a significant increase in battery life.

These electronic devices may employ a power supply to power their circuitry. The power supply may convert the output of the battery into consistent and usable power, and in some cases, a switching power converter may be employed as the power supply. Such a switching power converter may employ a pulse-width modulation (PWM) technique to control the power delivered to the circuitry in the active mode. While PWM may be efficient for controlling the power delivered to the circuitry in the active mode, a different modulation technique may be desirable for controlling the power delivered to the circuitry in the passive mode. For example, a pulse frequency modulation (PFM) mode or a pulse skipping modulation (PSM) mode may be desirable for control of the power delivered to the circuitry in the passive mode, as these modes may be able to sufficiently operate the circuitry in the passive mode while delivering less power than would be delivered by a PWM technique, thereby decreasing power consumption.

Fine control of the transition threshold of the switching converter between PWM and PFM/PSM modes can help to further reduce power consumption, and thus increase battery life of the device. To that end, developments in circuitry to finely control this transition threshold are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device may include a switching converter configured to convert an input voltage to an output voltage, and being selectively operable in a pulse skipping mode based upon a control signal. The switching converter may include a comparator having a first input configured to receive an error signal, a second input configured to receive a skipping mode reference signal, and an output configured to generate the control signal. In addition, a reference generator may be configured to generate the skipping mode reference signal as a function of a difference between the output voltage and the input voltage.

The switching converter may include an error amplifier having a first input configured to receive a feedback signal derived from the output voltage, a second input configured to receive an error reference signal, and an output configured to generate the error signal.

The reference generator may include a first current generator configured to generate a first current as a function of the input voltage, and a second current generator configured to generate a second current as a function of the output voltage. The reference generator may also include a differencing circuit configured to generate a difference current as a function of a difference between the first and second currents, and a conversion circuit configured to convert the difference current to the skipping mode reference signal.

The conversion circuit may include a pair of transistors configured to output a conversion voltage, and a first amplifier having a first input configured to receive the conversion voltage, a second input configured to receive an error reference signal, and an output configured to generate a difference voltage as a function of a difference between the conversion voltage and the error reference signal.

The pair of transistors may include a first transistor having a first conduction terminal configured to be coupled to the difference current, and a second conduction terminal, and a second transistor having a first conduction terminal configured to be coupled to the second conduction terminal of the first transistor, and a second conduction terminal configured to be coupled as feedback to the output of the first amplifier. The second conduction terminal of the first transistor and the first conduction terminal of the second transistor may cooperate to generate the conversion voltage as a function of a voltage drop across the second diode coupled transistor.

The conversion circuit may also include a second amplifier having a first input configured to receive the error reference signal, a second input configured to receive the difference voltage, and an output configured to generate the skipping mode reference signal as a function of a difference between the difference voltage and the error reference signal.

The electronic device may also include a voltage divider configured to couple the error reference signal to the first input of the second amplifier, and an input resistor configured to couple the difference voltage to the second output of the second amplifier. A feedback resistor may be coupled between the input resistor and the output of the second amplifier. A resistance of the input resistor may match a resistance of the feedback resistor.

The first current generator may include a first current generator resistor and a first current mirror having an input and an output. A first current generator input transistor may have a control terminal configured to be coupled to the input voltage, a first conduction terminal configured to be coupled to the first current generator resistor, and a second conduction terminal configured to be coupled to the input of the first current mirror. The output of the first current mirror may be configured to generate a first mirrored current as a function of a current flowing through the first current generator input transistor.

The first current generator may include a second current mirror having an input configured to be coupled to the output of the first current mirror, and an output configured to generate the first current as a function of the first mirrored current.

The second current generator may include a second current generator resistor, and a third current mirror having an input and an output. A second current generator input transistor may have a control terminal configured to be coupled to the output voltage, a first conduction terminal configured to be coupled to the second current generator resistor, and a second conduction terminal configured to be coupled to the input of the third current mirror. The output of the third current mirror may be configured to generate the second current as a function of a current flowing through the second current generator input transistor.

The differencing circuit may include a current comparator having a first input configured to receive the first current, a second input configured to receive the second current, and an output configured to generate the difference current as a function of a difference between the first current and the second current.

The electronic device may include one of a mobile telephone, a tablet, and an integrated circuit package.

Another aspect is directed to another electronic device. This electronic device may include a switching converter. The switching converter may include an error amplifier having a first input configured to receive a feedback signal derived from a second voltage, a second input configured to receive an error reference signal, and an output configured to generate an error signal. A first comparator may have a first input configured to receive the error signal, a second input configured to receive a skipping mode reference signal, and an output configured to generate a pulse skipping mode control signal. A second comparator may have a first input configured to receive the error signal, a second input configured to receive a width modulation mode reference signal, and an output configured to generate a pulse width modulation control signal. Control logic may be configured to be coupled to the pulse skipping mode control signal and the pulse width modulation control signal. In addition, an output transistor may be configured to be coupled to the control logic and a first voltage, and configured to output the second voltage based upon the control logic. A reference generator may be configured to generate the skipping mode reference signal as a function of a square root of a difference between the second voltage and the first voltage.

A method aspect is directed to a method of operating a power converter. The method may include generating a skipping mode reference signal as a function of a difference between an output voltage and an input voltage, using a reference generator. A control signal indicating that pulse skipping mode is to be entered may be generated based upon an error signal and the skipping mode reference signal, using a comparator.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
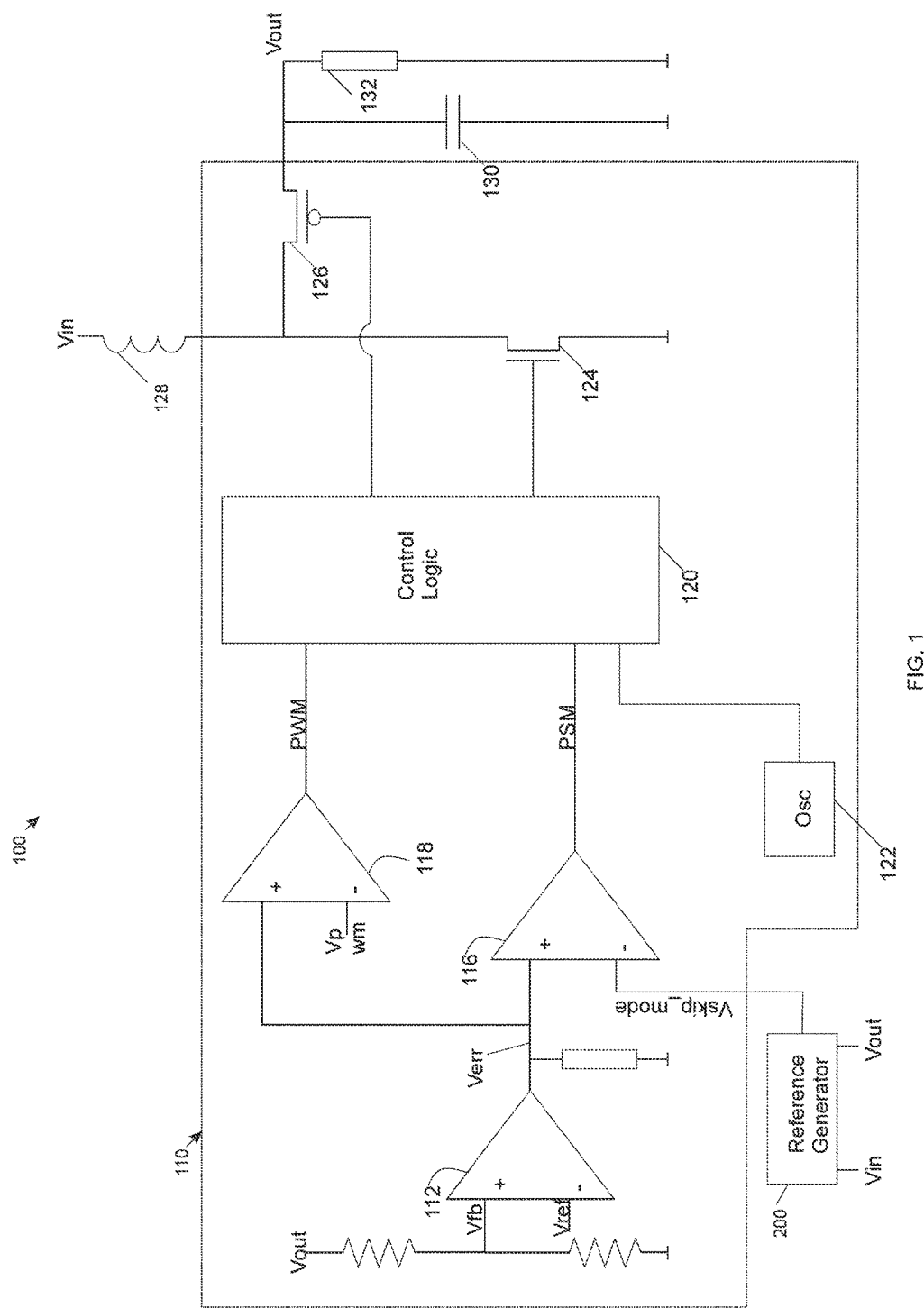
FIG. 1 is a schematic diagram of an electronic device in accordance with this disclosure.

Referring initially to FIG. 1, an electronic device 100 is now described. The electronic device 100 may be a cellular phone, a tablet, or any other portable battery powered device. In addition, the electronic device 100 may also be an integrated circuit. The electronic device 100 includes a switching converter 110 that is configured to convert an input voltage Vin to an output voltage Vout in either a pulse width modulation mode or a pulse skipping mode. The pulse width modulation mode is used for active operation of the electronic device 100 (for example, in the case where the electronic device is a cellular phone, the active mode might include making a voice call, browsing the internet, or playing a multimedia file), while the pulsed skipping mode is used for passive operation of the electronic device (here, in the case where the electronic device is a cellular phone, the passive mode might include an idle state with the display off).

The switching converter 110 includes an error amplifier 112 that receives a feedback signal Vfb derived from the output voltage and an error reference signal Vref as inputs, and generates an error signal Verr at its output. A first comparator 116 receives the error signal Verr and a skipping mode reference signal Vskip_mode at its inputs, and generates a pulse skipping mode control signal PSM at its output. The skipping mode reference Vskip_mode signal is generated by the reference generator 200 as a function of the difference between the output voltage Vout and the input voltage Vin. As will be explained in detail below, the function may be the square root of the difference between the output voltage Vout and the input voltage Vin.

A second comparator 118 receives the error signal Verr and a pulse width modulation mode signal Vpwm (which may be a sawtooth waveform) at its inputs, and generates a pulse width modulation control signal PWM at its output. Control logic 120 is coupled to the outputs of the first comparator 116 and second comparator 118, as well as a clock signal from an oscillator 122. The control logic 120 is coupled to the gate terminals of the PMOS transistor 126, and the NMOS transistor 124, and operates these transistors so as to deliver power to the load 132 in either a pulse skipping mode or a pulse width modulation mode. Depending on the output of the control logic 120, current will flow from Vin, through the inductor 128, and either the PMOS transistor 126 (during a portion of the cycle during which power is to be delivered) or the NMOS transistor 124 (during a portion of the cycle during which power is not to be delivered). When the NMOS transistor 124 is on (thus, during a portion of the cycle during which power is not to be delivered), current that flows through the inductor 128 is stored. If the output of the control logic 120 is such that the current flows through the PMOS transistor 126, the current flows then through the load 132, which is coupled in parallel with a capacitor 130. In addition, if current was stored in the inductor 128, it flows therefrom to the load when the PMOS transistor 126 is on (thus, during a portion of the cycle during which power is to be delivered). If the output of the control logic 120 is such that the current flows through the NMOS transistor 124, the current then flows to ground.

The current flowing through the inductor 128, in pulse skipping mode, can be represented mathematically as:

$$Ipeak = \frac{Vin}{L} * d * T \quad (1)$$

where d is the duty cycle of the device, and T is the switching period. As will be understood by those of skill in the art, current transfers to the load 132 during the $d_2T$ period. $d_2$ can be represented mathematically as:

$$d_2 = \frac{Vin}{Vout - Vin} * d \quad (2)$$

the load current can thus be represented mathematically as:

$$I_o * T = \frac{Ipeak}{2} * d_2 * T \quad (3)$$

Therefore, the equation can be simplified as:

$$I_o = \frac{Ipeak}{2} * d_2 = \frac{Ipeak}{2} * \frac{Vin}{Vout-Vin} * d = \frac{Vin}{2*L} * d * t * \frac{Vin}{Vout-Vin} * d \quad (4)$$

Thus, the load current, as simplified, can be represented mathematically as:

$$Io = \frac{Vin^2}{2*L(Vout-Vin)} * d^2 T \quad (5)$$

By modeling the load as an equivalent sense resistor, the voltage proportional to the current across the inductor 128 can be mathematically represented as:

$$Vc = Ipeak * Rsens = \frac{Vin}{L} * d * T * Rsens \quad (6)$$

Solving for d yields:

$$d = \frac{Vc}{Vin * Rsens * T} * L \quad (7)$$

Plugging this value of d into the equation for Io yields:

$$Io = \frac{Vc^2}{2*(Vout-Vin)*Rsens^2 * T} * L \quad (8)$$

This can be rewritten as:

$$Io = \frac{Vc^2}{(Vout-Vin)} * K \quad (9)$$

where K is:

$$K = \frac{L}{2*Rsens^2 * T} \quad (10)$$

Figure 2:
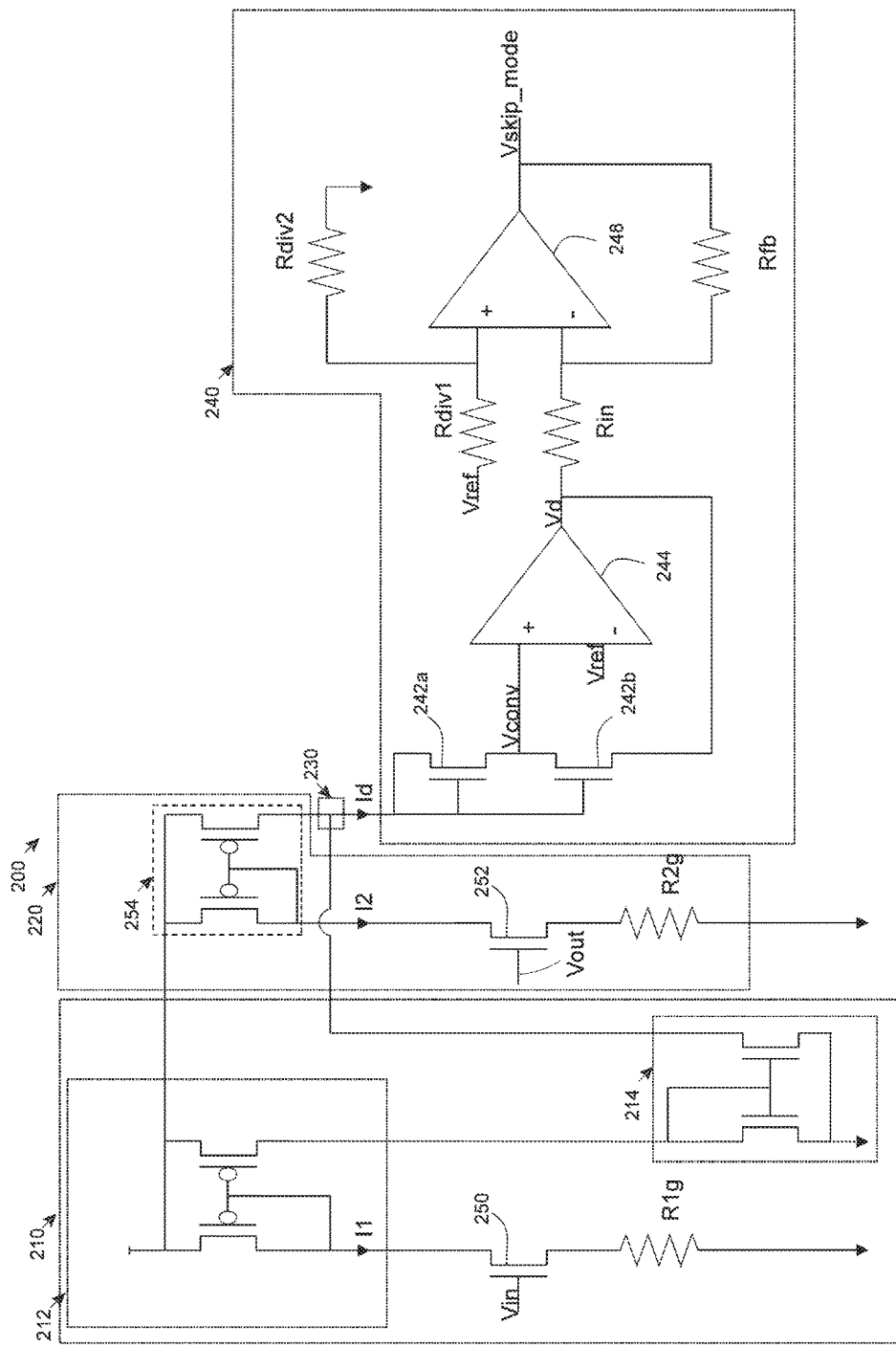
FIG. 2 is a schematic diagram of the reference generator of the electronic device of FIG. 1.

The reference generator 200 will now be described in greater detail with reference to FIG. 2. The reference generator 200 includes a first current generator 210 that generates a first current I1 as a function of the input voltage Vin, and a second current generator 220 that generates a second current I2 as a function of the output voltage Vout. A differencing circuit 230 generates a difference current Id as a function of the difference between the first and second currents. A conversion circuit 240 converts the difference current Id to the skipping mode reference signal Vskip_mode.

The first current generator 210 will now be described in more detail. The first current generator 210 includes a first current generator input transistor 250 that has its control terminal coupled to the input voltage Vint, and has its conduction terminals coupled to a first current generator resistor R1g and the input of a first current mirror 212. The first current mirror 212 mirrors the current I1 flowing through the first current generator input transistor 250 to its output, which is coupled to the input of a second current mirror 214. The second current mirror mirrors the current I1 to its output as the first current applied to the differencing circuit 230.

The second current generator 220 will now be described in more detail. The second current generator 220 includes a second current generator input transistor 252 that has its control terminal coupled to the output voltage Vout, and has its conduction terminals coupled to a second current generator resistor R2g (which has the same resistance as the first current generator resistor R1g in the illustrated embodiment) and to the input of a third current mirror 254. The third current mirror 254 mirrors the current I2 flowing through the second current generator input transistor 252 to its output as the second current to the differencing circuit 230.

The differencing circuit 230 is a current comparator that receives the first current I1 and second current I2 as inputs, and generates a difference current Id at its output. The difference current Id is equal to a difference between the first current I1 and the second current I2, and can be described mathematically as:

$$Id = \frac{Vout - Vin}{R1g}$$

It should be noted that although R1g is used in the equation above, R2g could have been used instead, as the resistors have the same resistance in the illustrated embodiment.

The conversion circuit 240 will now be described in greater detail. The conversion circuit 240 includes a pair of transistors 242a, 242b configured to output a conversion voltage Vconv, and in an arrangement that will be described in more detail below. The conversion voltage Vconv is received by an input of a first amplifier 244, while a second input of the first amplifier receives the error reference signal Vref. The first amplifier 244 generates a difference voltage Vd at its output as a function of the difference between the conversion voltage Vconv and the error reference signal Vref.

The first transistor 242a has a first conduction terminal coupled to the difference current Id, a second conduction terminal coupled to a first conduction terminal of the second transistor 242b, and a control terminal also coupled to the difference current Id. The second transistor 242b also has a second conduction terminal coupled as feedback to the output of the first amplifier 244, and a control terminal coupled to the different current Id. The coupling between the conduction terminals of the first transistor 242a and the second transistor 242b serves to generate the conversion voltage Vconv as a function of a voltage drop across the second transistor.

The pair of transistors 242a, 242b and the first amplifier 244 together form a square root circuit. The difference voltage Vd, as output by the first amplifier 244 can therefore be described mathematically as:

$$Vd = Vref - K1 * \sqrt{Vout - Vin}$$

$$\text{where } K1 = \frac{.59}{\sqrt{\mu n * Cox\left(\frac{W}{L}\right) * R1g}}$$

A voltage divider comprised of the resistors Rdiv1 and Rdiv2 (which have equal resistance values in the illustrated embodiment) couples the error reference signal Vref to the input of a second amplifier 248. An input resistor Rin couples the difference voltage to the input of the second amplifier 248, and a feedback resistor Rfb (which has the same resistance as the input resistor in the illustrated embodiment) is coupled between the input resistor and the output of the second amplifier. The second amplifier 248 receives the error reference signal Vref and the difference voltage Vd as described, and generates the skipping mode reference signal Vskip_mode as a function of the difference between the difference voltage and the error reference signal. Thus, the second amplifier 248 acts as a subtractor and subtracts the error reference signal Vref from the different voltage Vd. The operation of the subtractor can be mathematically described as:

$$Vd - Vref = K1 * \sqrt{Vout - Vin}$$

The skipping more reference signal Vskip_mode can thus be mathematically described as:

$$Vskip\_mode = K1 * \sqrt{Vout - Vin}$$

The circuits disclosed herein can help finely control the switchover from PWM mode to PSM mode, and thus help reduce power consumption, as explained above. Those of skill in the art will appreciate that this disclosure contemplates and covers related methods of circuit operation.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A circuit, comprising:
    a switching converter circuit configured to operate in a pulse skipping mode to generate an output voltage from an input voltage;
    an error amplifier configured to generate an error signal in response to a difference between a feedback voltage derived from the output voltage and a reference voltage;
    a first comparator configured to generate a pulse skip mode control signal in response to a comparison of the error signal to a skip mode reference signal; and
    a skip mode reference generator circuit configured to generate the skip mode reference signal as a square root function of a difference between the output voltage and the input voltage.

2. The circuit of claim 1, wherein the switching converter circuit is further configured to operate in a pulse width modulation mode and further comprising a second comparator configured to generate a pulse width modulation mode control signal in response to a comparison of the error signal to a pulse width modulation voltage signal.

3. The circuit of claim 2, wherein the pulse width modulation voltage signal is a ramp signal.

4. The circuit of claim 1, wherein the skip mode reference generator circuit comprises:
    a first circuit configured to generate a first signal in response to the input voltage;
    a second circuit configured to generate a second signal in response to the output voltage;
    a summation circuit configured to generate a third signal in response to a difference between the first and second signals; and
    a square root circuit configured to generate a conversion voltage from the third signal, wherein the skip mode reference signal is derived from the conversion voltage.

5. The circuit of claim 4, wherein the square root circuit comprises:
a first transistor having a source-drain path;
a second transistor having a source drain path connected in series with the source-drain path of the first transistor at an output node;
wherein the third signal is applied to the series connected source-drain paths and to control terminals of the first and second transistors and the conversion voltage is generated at the output node.

6. The circuit of claim 5, wherein the skip mode reference generator circuit further comprises a differencing circuit configured to generate a difference voltage as a function of a difference between the conversion voltage and the reference voltage.

7. The circuit of claim 6, wherein the skip mode reference generator circuit further comprises a subtraction circuit configured to generate the skip mode reference signal by subtracting a fraction of the reference voltage from the difference voltage.

8. The circuit of claim 7, further comprising a resistive divider circuit having an input configured to receive the reference voltage and an output configured to generate a voltage that is said fraction of the reference voltage.

9. A circuit, comprising:
a switching converter circuit configured to operate in a pulse skipping mode to generate an output voltage from an input voltage;
an error amplifier configured to generate an error signal in response to a difference between a feedback voltage derived from the output voltage and a reference voltage;
a first comparator configured to generate a pulse skip mode control signal in response to a comparison of the error signal to a skip mode reference signal; and
a skip mode reference generator circuit configured to generate said skip mode reference signal, wherein the skip mode reference generator circuit comprises:
a converter circuit configured to generate a conversion voltage as a function of a difference between the output voltage and the input voltage; and
a differencing circuit configured to generate a difference voltage as a function of a difference between the conversion voltage and the reference voltage, wherein the skip mode reference signal is derived from the difference voltage.

10. The circuit of claim 9, wherein the function of the difference between the output voltage and the input voltage is a square root function.

11. The circuit of claim 9, wherein the skip mode reference generator circuit further comprises a subtraction circuit configured to generate the skip mode reference signal by subtracting a fraction of the reference voltage from the difference voltage.

12. The circuit of claim 11, further comprising a resistive divider circuit having an input configured to receive the reference voltage and an output configured to generate a voltage that is said fraction of the reference voltage.

13. The circuit of claim 9, wherein the converter circuit comprises:
a first current generator configured to generate a first current having a magnitude proportional to the input voltage;
a second current generator configured to generate a second current having a magnitude proportional to the output voltage; and
a current summation circuit configured to generate a third current as a function of a difference between the first and second currents.

14. The circuit of claim 13, wherein the converter circuit further comprises a square root circuit configured to generate the conversion voltage from the third current.

15. The circuit of claim 14, wherein the square root circuit comprises:
a first transistor having a source-drain path;
a second transistor having a source drain path connected in series with the source-drain path of the first transistor at an output node;
wherein the third current is applied to the series connected source-drain paths and to control terminals of the first and second transistors and the conversion voltage is generated at the output node.

16. A method, comprising:
operating a switching converter circuit in a pulse skipping mode to generate an output voltage from an input voltage;
determining a difference between a feedback voltage derived from the output voltage and a reference voltage to generate an error signal;
comparing the error signal to a skip mode reference signal to generate a pulse skip mode control signal for controlling operation of the switching converter circuit in the pulse skipping mode; and
generating the skip mode reference signal as a square root function of a difference between the output voltage and the input voltage.

17. The method of claim 16, further comprising operating the switching converter circuit in a pulse width modulation mode and wherein the pulse skip mode control signal control change of operation of the switching converter circuit between pulse width modulation mode and pulse skipping mode.

18. The method of claim 16, wherein generating the skip mode reference signal comprises:
generating a first signal in response to the input voltage;
generating a second signal in response to the output voltage;
generating a third signal in response to a difference between the first and second signals; and
generating a conversion voltage with the square root function of the third signal, wherein the skip mode reference signal is derived from the conversion voltage.

19. The method of claim 18, further comprising generating a difference voltage as a function of a difference between the conversion voltage and the reference voltage.

20. The method of claim 19, wherein generating the skip mode reference signal further comprises subtracting a fraction of the reference voltage from the difference voltage.

21. A method, comprising:
operating a switching converter circuit in a pulse skipping mode to generate an output voltage from an input voltage;
determining a difference between a feedback voltage derived from the output voltage and a reference voltage to generate an error signal;
comparing the error signal to a skip mode reference signal to generate a pulse skip mode control signal for controlling operation of the switching converter circuit in the pulse skipping mode; and
generating the skip mode reference signal from the input voltage and output voltage, wherein generating the skip mode reference signal comprises:

generating a conversion voltage as a function of a difference between the output voltage and the input voltage; and generating a difference voltage as a function of a difference between the conversion voltage and the reference voltage, wherein the skip mode reference signal is derived from the difference voltage.

22. The method of claim 21, wherein the function of the difference between the output voltage and the input voltage is a square root function.

23. The method of claim 21, further comprising subtracting a fraction of the reference voltage from the difference voltage to generate the skip mode reference signal.

24. The method of claim 21, wherein generating the conversion voltage comprises:

generating a first current having a magnitude proportional to the input voltage;

generating a second current having a magnitude proportional to the output voltage; and generating a third current as a function of a difference between the first and second currents.

25. The method of claim 24, further comprising determining the conversion voltage based on a square root of a signal generated in response to the third current.

* * * * *